United States Patent [19]
Michael et al.

[11] Patent Number: 5,284,320
[45] Date of Patent: Feb. 8, 1994

[54] SURFACE VALVE WITH PRESSURE ENERGIZED SEAL AND GEAR ACTUATION

[75] Inventors: Robert K. Michael, Lewisville; Timothy M. Young, Coppell, both of Tex.

[73] Assignee: Halliburton Company, Duncan, Okla.

[21] Appl. No.: 929,635

[22] Filed: Aug. 12, 1992

[51] Int. Cl.$^5$ .................................................. F16K 3/00
[52] U.S. Cl. ...................................... 251/304; 251/172; 251/248
[58] Field of Search ............... 251/172, 248, 302, 304

[56] References Cited

U.S. PATENT DOCUMENTS

| | | | |
|---|---|---|---|
| 1,414,320 | 4/1922 | Zucs et al. | 251/248 X |
| 1,951,121 | 3/1934 | Babcock | 251/304 X |
| 2,813,695 | 11/1957 | Stogner | 251/159 |
| 2,911,187 | 11/1959 | Owsley | 251/316 |
| 2,954,961 | 10/1960 | Stogner et al. | 251/312 |
| 3,133,722 | 5/1964 | McGuire et al. | 251/309 |
| 3,346,002 | 10/1967 | Thompson, Jr. et al. | 137/246.22 |
| 3,430,919 | 3/1969 | Frazier | 251/283 |
| 3,479,006 | 11/1969 | Brown | 251/174 |
| 4,432,387 | 2/1984 | Sims | 251/302 X |
| 4,471,965 | 9/1984 | Jennings et al. | 277/26 |
| 4,741,509 | 5/1988 | Bunch et al. | 251/172 |
| 4,796,858 | 1/1989 | Kabel | 251/171 |

OTHER PUBLICATIONS

FMC Corporation advertisement entitled "a breakthrough seal technology:".
Publication dated Autumn 1984, from *Taking the Lead*, entitled "FMC research teams answer the fire-resistant challenge with a surprisingly simple—and versatile—design".
FMC Marketing Bulletin No. 1003 dated Jan., 1985.
Undated publication entitled "FMC New Generation Metal Seal Pipe Connector".

*Primary Examiner*—John C. Fox
*Attorney, Agent, or Firm*—Tracy W. Druce; Neal R. Kennedy

[57] ABSTRACT

A surface valve with pressure energized seals and having gear actuation. The valve comprises a body with a rotating valve plate therein. The pressure energized seals provide sealing engagement between the valve plate and body. An actuation gear with a geared surface having a cam-shaped pitch line is positioned adjacent to the valve plate. An eccentrically rotated pinion gear is engaged with the actuation gear for providing rotation of the actuation gear and corresponding movement of the valve plate between open and closed positions thereof.

24 Claims, 2 Drawing Sheets

SURFACE VALVE WITH PRESSURE ENERGIZED SEAL AND GEAR ACTUATION

BACKGROUND OF THE INVENTIION

1. Field Of The Invention

This invention relates to valves which require a gas-tight seal such as surface valves used on oil and gas wells, and more particularly, to such a valve having pressure energized seals and a gear actuation mechanism for opening and closing the valve.

2. Description Of The Prior Art

Surface valves utilized on oil and gas wells must be as gas-tight as possible to minimize the potential hazard of gas leakage. There are a number of prior art types of valves used, such as rotating plug valves, ball valves, gate valves, etc. Probably, the most commonly used valves are gate valves.

A problem with existing gate valve designs is that they have a relatively large number of parts and are somewhat expensive to manufacture. Also, they are not easily redressed after the valve has been subjected to wear, and they are not particularly well adapted to have components thereof fabricated from hard materials, such as ceramics or tungsten carbide materials.

The present invention provides a rotating valve with fewer number of parts than the typical gate valve and which is relatively inexpensive to manufacture The valve of the present invention is also easily, redressed and components thereof may be easily fabricated from ceramic or tungsten carbide materials.

SUMMARY OF THE INVENTION

The surface valve of the present invention utilizes pressure energized seals and also has gear actuation for opening and closing the valve. The valve comprises a body having an inlet and an outlet. The body also has a first surface adjacent to the inlet and a second surface adjacent to the outlet and spaced from the first surface. The valve further comprises a plate disposed between the first and second surfaces and defining a port therethrough, first sealing means for sealingly engaging a first side of the plate and a second sealing means for sealingly engaging a second side of the plate. The plate is movable between an open position wherein the port is substantially aligned with the inlet and outlet for providing communication therebetween and a closed position wherein the port is unaligned with the inlet and outlet. The first sealing means is disposed around an end of the inlet such that differential pressure as a result of fluid flowing through the valve forces the first sealing means against the first surface of the plate, and the second sealing means is disposed around an end of the outlet such that differential pressure forces the second side of the plate against the second sealing means as a result of fluid flowing through the valve. The first and second surfaces of the body and the first and second sides of the plate are substantially parallel.

In the preferred embodiment, the first surface defines a recess therein around the end of the inlet, and the second surface defines a second recess therein around the end of the outlet. The first sealing means is disposed in the first recess, and the second sealing means is disposed in the second recess. The first recess has a shoulder therein sealingly engaged with the first seal, and the second recess has a shoulder therein sealingly engaged with the second seal. These shoulders are angled with respect to a central axis of the first and second sealing means. That is, the shoulders are angled with respect to a central axis of the inlet and outlet.

The first and second sealing means preferably comprise an annular seal member and an elastomeric sealing means, such as an O-ring. The first and second sealing means define a groove thereon adapted for receiving a tool therein, such as a screwdriver, for facilitating removal of the first and second sealing means from the first and second recesses, respectively.

The valve of the present invention may also be said to comprise a body defining a cavity therein with first and second facing surfaces on opposite ends of the cavity, a plate defining a port therethrough and rotatably disposed in the cavity between an open position wherein the port provides communication between an inlet and outlet of the body and a closed position wherein the plate prevents communication between the inlet and outlet of the body, an actuation gear disposed in the cavity adjacent to the plate and having a geared surface thereon, and a pinion gear having a geared surface thereon in geared engagement with the actuation gear such that rotation of the pinion gear results in rotation of the actuation gear and the plate for moving the plate between its open and closed positions.

A shaft extends from the pinion gear, and in one embodiment, the shaft is eccentric with respect to the pinion gear. The geared surface of the actuation gear has a cam-shaped pitch line adapted for maintaining the geared surface in geared engagement with the pinion gear as the pinion gear is eccentrically rotated about the shaft. The shaft may be integrally formed with the pinion gear.

The shaft extends through a portion of the body, and the valve further comprises sealing means for sealing between the shaft and the body. This sealing means comprises a metal-to-metal sealing means and an elastomeric sealing means.

The valve also comprises bushing means disposed in the cavity and around the plate and actuation gear for facilitating rotation of the plate and actuation gear in the cavity. This bushing means is preferably characterized by a substantially cylindrical bushing. A sealing means may be disposed between the bushing means and the body. This sealing means is preferably characterized by a metal-to-metal seal portion disposed around the bushing means and may further comprise an elastomeric sealing means, such as an O-ring for sealing between the metal-to-metal seal and the body.

Numerous objects and advantages of the invention will become apparent as the following detailed description is read in conjunction with the drawings which illustrate such embodiment.

DESCRIPTION OF THE PREFERRED EMBODIMENT

Figure 1:
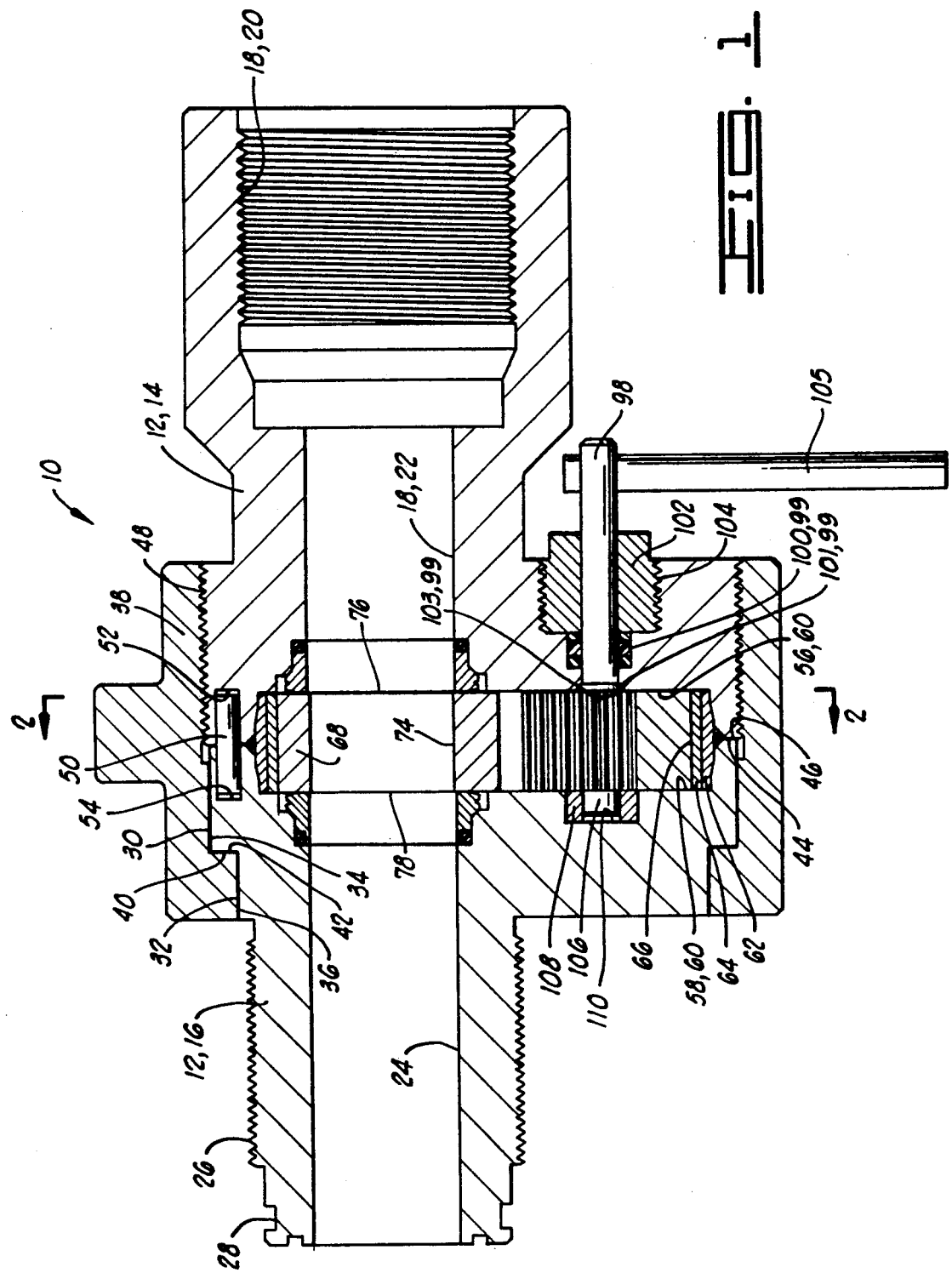
FIG. 1 is a longitudinal cross section of the surface valve of the present invention as taken along lines 1—1 in FIG. 2.
Figure 2:
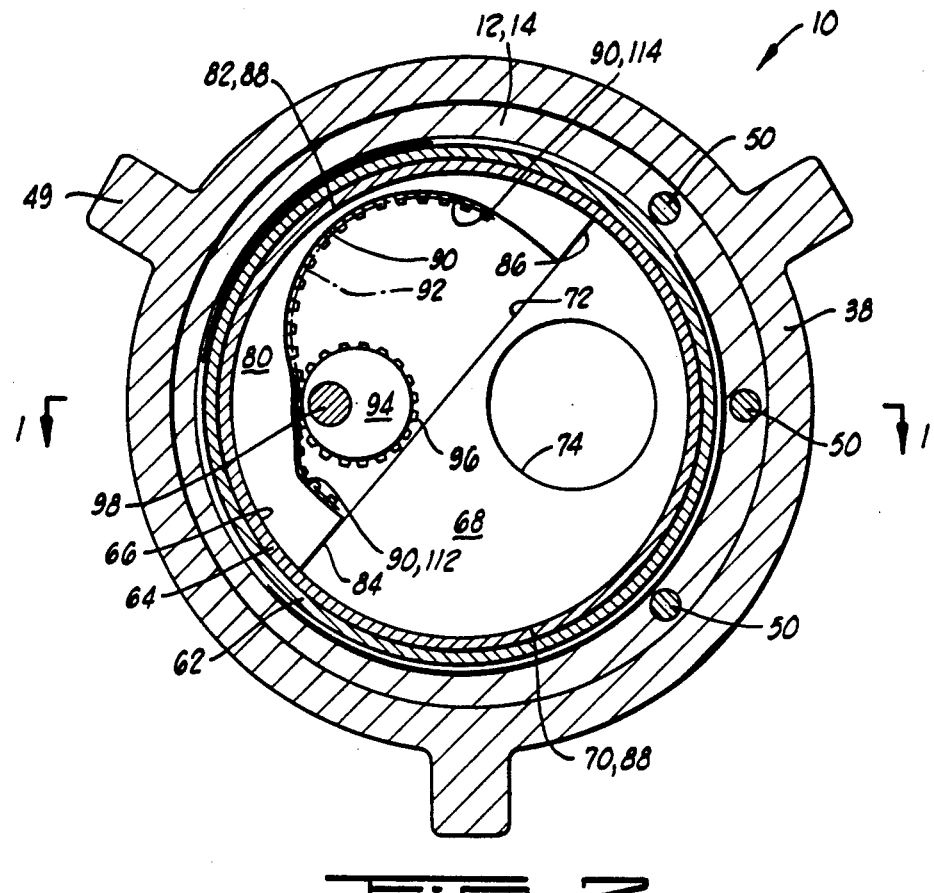
FIG. 2 is a cross-sectional view taken along lines 2—2 in FIG. 1.

Referring now to the drawings, and more particularly to FIGS. 1 and 2, the surface valve with pressure energized seals and gear actuation of the present invention is shown and generally designated by the numeral 10.

Valve 10 generally comprises a body 12 having an inlet body portion 14 and an outlet body portion 16.

Inlet body portion 14 may also be referred to as a box end body and has an inlet 18 consisting of an internally threaded surface 20 and a flow passage 22. In the illustrated embodiment, threaded surface 20 is adapted for receiving an externally threaded portion of a pipe or other fitting in a manner known in the art. However, any other means of connecting inlet body portion 14 to a pipe or other fitting, such as an API flange, hammer union, etc., may be used. The invention is not intended to be limited to the particular embodiment shown.

Outlet body 16, also referred to as pin end body 16, has an outlet 24, generally characterized as a flow passage 24. In the illustrated embodiment, outlet body 16 has an externally threaded surface 26 and a seal groove 28 thereon and is adapted for connection to a pipe or other fitting, also in a manner known in the art. However, any other means of connecting outlet body 16 to a pipe or other fitting, such as an API flange, hammer union, etc., may also be used. The invention is not intended to be limited to any particular embodiment.

Outlet body 16 has a first outside diameter 30 and a smaller second outside diameter 32 which are received within a first bore 34 and a second bore 36, respectively, of an outer retainer 38. A shoulder 40 on outlet body 16 thus engages a corresponding shoulder 42 in outer retainer 38.

Inlet body 14 has a first surface 44 thereon, and outlet body 16 has a second surface 46 thereon facing first surface 44. Inlet body 14 is connected to outer retainer 38 at threaded connection 48 so that first surface 44 of the inlet body is clamped against second surface 46 of outlet body 16. It will be seen by those skilled in the art that shoulder 40 on outlet body 16 is thus clamped against shoulder 42 in outer retainer 38 so that the outer retainer, inlet body 14 and outlet body 16 form a complete body assembly. A plurality of lugs 49 on retainer 38 facilitate rotation of outer retainer 38 and the clamping action provided by the outer retainer.

It will be seen that inlet 18 is eccentrically disposed with respect to threaded connection 48. Similarly, outlet 24 is eccentrically disposed with respect to first and second outside diameters 30 and 32 on outlet body 16.

A plurality of alignment pins 50 extend into aligned holes 52 and 54 in inlet body 14 and outlet body 16, respectively, for precisely aligning the inlet and outlet bodies with one another.

First and second cavity portions 56 and 58 are defined in inlet body 14 and outlet body 16, respectively, to form a cavity 60 between the bodies.

Disposed in cavity 60 is a sealing means, comprising a metal-to-metal seal 62, and a bushing means, such as bushing 64, which is located radially inwardly of seal 62. Bushing 64 has a bore 66 therethrough which may also be referred to as a bearing surface 66. The details of metal-to-metal seal 62 will be discussed further herein.

A valve plate 68 is disposed within cavity 60 inside bushing 64. Valve plate 68 has a a partially cylindrical first outer surface 70 and a flat second outer surface 72 and thus can be generally described as having a "half-moon" configuration. An eccentrically located valve port 74 is defined through valve plate 68. Valve plate 68 also has substantially parallel, opposite first and second sides 76 and 78. Valve plate 68 may be made of a hard material, such as ceramic or tungsten carbide. Also, valve plate 68 may be made of another material, such as steel, and plated or coated with tungsten carbide, ceramic or other hard material.

A generally C-shaped actuation gear 80 is disposed in cavity 60 inside bushing 64 and adjacent to valve plate 68. Actuation gear 80 has a partially cylindrical first outer surface 82 and flat, coplanar second and third outer surfaces 86.

Second and third outer surface 84 and 86 of actuation gear 80 are adapted to mate against second outer surface 72 of valve plate 68, as best seen in FIG. 2. In this position, first outer surface 70 of valve plate 68 and first outer surface 82 of actuation gear 80 form a complete substantially cylindrical surface 88 which is in close, rotatable relationship with bearing surface 66 in bushing 64. It will be seen by those skilled in the art that valve plate 68 and actuation gear 80 must rotate together within bushing 64.

Actuation gear 80 has an internally geared surface 90 which generally faces second outer surface 72 of valve plate 68 between second and third outer surfaces 84 of the actuation gear. Geared surface 90 is curvilinear and may also be referred to as a geared cam surface 90, having a cam-shaped pitch line 92.

While valve plate 68 and actuation gear 80 are shown as separate components, the valve plate and actuation gear could also be integrally formed in some cases.

A pinion gear 94 is disposed between geared surface 9 of actuation gear 80 and second outer surface 72 of valve plate 68. Pinion gear 94 has a geared surface 96 adapted for geared engagement with geared surface 90 of actuation gear 80.

An actuation shaft or rod 98 extends from pinion gear 94 and is preferably located eccentrically with respect to geared surface 96. As best seen in FIG. actuation shaft 98 extends outwardly from inlet body 14. A sealing means 99, including a metal-to-metal seal and an elastomeric seal, provides sealing engagement between actuation shaft 98 and inlet body 14. The elastomeric sealing means may be characterized as a set of V-ring packing 100. A packing nut 102 is positioned around actuation shaft 98 and is connected to inlet body 14 at threaded connection 104 to hold packing 100 in place. The metal-to-metal sealing means may be characterized by metal-to-metal engagement between a chamfer 101 on actuation shaft 98 with a corresponding chamfer 103 in inlet body 14.

A handle 105 is attached to the end of actuation shaft 98 which extends outwardly from packing nut 102.

On an opposite side of actuation shaft 98, a support or guide shaft 106 extends from pinion gear 94. Support shaft 106 is coaxial with actuation shaft 98. Support shaft 106 is rotatably supported within a bushing 108 which is disposed in a recess 110 defined in outlet body 16.

In the preferred embodiment, pinion gear 94, actuation shaft 98 and support shaft 106 are integrally formed. However, it will be seen by those skilled in the art that another method of manufacture would include actuation shaft 98 and support shaft 106 being a single shaft extending through pinion gear 94 and connected thereto. The invention is not intended to be limited to any particular method of construction of these parts.

As illustrated in FIG. 1, valve port 74 in valve plate 68 is aligned with inlet flow passage 22 in inlet body 14 and outlet flow passage 24 in outlet body 16. Thus, valve plate 68 is illustrated in an open position thereof, which corresponds to an open position of the entire valve 10.

Referring now to FIG. 2, it will be seen that rotation of actuation shaft 98 by handle 105 results in corresponding rotation of pinion gear 94 about the center line of actuation shaft 98. Because of the eccentric mounting of pinion gear 94 with respect to actuation shaft 98 and the configuration of geared surface 90, clockwise rotation of pinion gear 94 as viewed in FIG. 2 is substantially prevented, thus providing a stop means for limiting rotation of pinion gear 94. It will be seen by those skilled in the art that any significant clockwise rotation of pinion gear 94 will result in interference of geared surface 96 thereof with portion 112 of geared surface 90 on actuation gear 80. However, because of the cammed shape of geared surface 90 on the other side of pinion gear 94, counterclockwise rotation of pinion gear 94 is possible. The cam-shaped pitch line 92 of geared surface 90 is shaped such that geared engagement is maintained between geared surface 90 and geared surface 96. Thus, as pinion gear 94 is rotated counterclockwise, as viewed in FIG. 2, actuation gear 80 and valve plate 68 are also rotated counterclockwise.

Counterclockwise rotation ceases when geared surface 96 of pinion gear 94 engages portion 114 of geared surface 90 on actuation gear 80, thus providing another stop means for preventing rotation of pinion gear 94.

The components are sized and shaped such that this complete cycle of movement of pinion gear 94 and actuation gear 80 results in rotation of actuation gear 80 and valve plate 68 approximately 180° within bushing 64. The actual amount of rotation is not particularly critical so long a valve port 74 in valve plate 68 is moved out of alignment with inlet flow passage 22 and inlet body 14 and outlet flow passage 24 and outlet body 16 which corresponds to a closed position of valve plate 68 and valve 10.

To reopen the valve, actuation shaft 98 is rotated back clockwise as viewed in FIG. 2.

Figure 3:
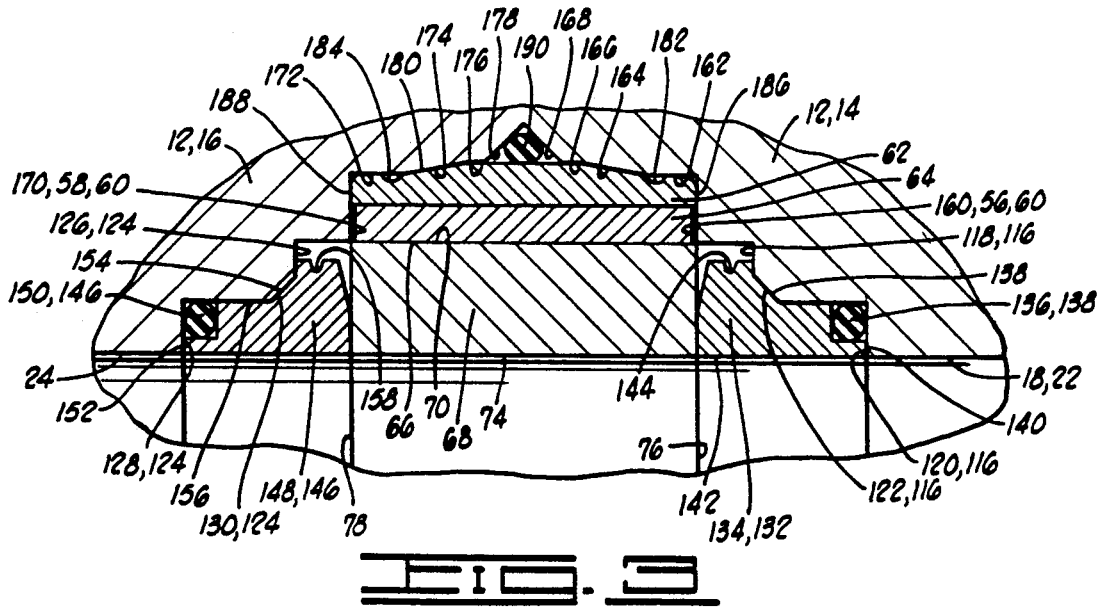
FIG. 3 shows an enlarged portion of FIG. 1.

Referring now also to FIG. 3, inlet valve body 14 defines a generally annular first recess 116 therein which is substantially coaxial with inlet flow passage 22. It will be seen that first recess 116 is in communication with cavity 60. First recess 116 has outer and inner shoulders 118 and 120 therein with an intermediate shoulder 122 therebetween. Intermediate shoulder 122 is angled with respect to the central axis of inlet flow passage 22.

Similarly, outlet body 16 has a second recess 124 therein which includes an outer shoulder 126, an inner shoulder 128 and an intermediate shoulder 130. Intermediate shoulder 130 is angled with respect to the central axis of outlet flow passage 24. Preferably, second recess 124 is substantially identical to first recess 116, and the first and second recesses face one another.

A first sealing means 132 is disposed in first recess 116 for providing sealing engagement between inlet body 14 and valve plate 68. Preferably, but not by way of limitation, first sealing means 132 comprises an annular first seal 134 which is adapted for sealing engagement against first side 76 of valve plate 68 and an elastomeric sealing means, such as O-ring 136, which provides sealing engagement between first seal 134 and inlet body 14. First seal 134 has an angled surface 138 which is sealingly engaged with intermediate shoulder 122 in first recess 116. Radially inwardly from O-ring 138, first seal 134 has an annular shoulder 140 thereon which is not sealingly engaged with inner shoulder 120 in first recess 116. Thus, it will be seen by those skilled in the art that shoulder 140 is exposed to fluid pressure in inlet flow passage 122. First seal 134 also defines a central opening 142 therethrough which is substantially aligned with inlet flow passage 22 and with valve port 74 when valve plate 68 is in the open position illustrated.

First seal 134 further defines a radially outwardly facing groove 144 therein. Groove 144 is adapted for receiving the end of a screwdriver or similar tool to facilitate removal of first seal 134 from first recess 116 when replacement of the first seal is desired.

A second sealing means 146, substantially identical to first sealing means 132, is disposed in the second recess 124 in outlet body 16. Second sealing means 146 preferably comprises a second seal 148 which sealingly engages second side 78 of valve plate 68. An elastomeric sealing means, such as O-ring 150, provides sealing engagement between first seal 148 and outlet body 16. Radially inwardly from O-ring 150, second seal 148 defines an annular shoulder 152 which is not sealingly engaged with inner shoulder 128 of second recess 124. Thus, it will be seen by those skilled in the art that annular shoulder 152 is exposed to fluid pressure from outlet flow passage 24. First seal 148 has an angle surface 154 which sealingly engages intermediate shoulder 130 of second recess 124.

Second seal 148 defines a central opening 156 therethrough which is aligned with outlet flow passage 24 and valve port 74 of valve plate 68 when the valve plate is in the open position.

Second seal 148 further defines an outwardly facing groove 158 therein which is adapted for receiving the end of a screwdriver or other tool to facilitate removal of the second seal 148 from second recess 124 when desired.

Still referring to FIG. 3, metal-to-metal seal 62 is shown in greater detail in its position radially outwardly from bushing 64. The surfaces forming the radially outer portion of first cavity portion 56 include a shoulder 160 which is substantially perpendicular to the axis of inlet flow passage 22, a cylindrical portion 162 which extends from shoulder 160, a conical portion 164, a slightly larger cylindrical portion 166 and a chamfer 168.

Similarly, second cavity portion 58 of cavity 60 is partially defined by a shoulder 170, cylinder portion 172, conical portion 174, larger cylindrical portion 176 and chamfer 178.

Metal-to-metal seal 62 has a radially outwardly facing surface 180 which is generally shaped to conform to the above-described areas of first and second cavity portions 56 and 58, as shown in detail in FIG. 3. Outer surface 180 has a pair of outwardly facing annular grooves 182 and 184 on opposite ends thereof. When metal-to-metal seal 62 is positioned as illustrated, longitudinal ends 186 and 188 thereof are clamped by shoulder 160 and 170, respectively. Grooves 80 and 82 allow a slight flexing of metal-to-metal seal 62 so that metal-to-metal sealing engagement is obtained. Also, it is contemplated that conical portions 164 and 174 will sealingly engage the corresponding portions of outer surface 180 of seal 62. To further insure effective sealing, an elastomeric sealing means, such as O-ring 190, is positioned in the annular space formed by outer surface 180 of seal 62 and chamfers 168 and 178. Thus, this elastomeric sealing means provides sealing engagement between inlet body 14, outlet body 16 and metal-to-metal seal 62.

It will be seen, therefore, that the surface valve with pressure-energized seal and gear actuation of the present invention is well adapted to carry out the ends and advantages mentioned as well as those inherent therein. While a presently preferred embodiment of the apparatus has been shown for the purposes of this disclosure, numerous changes in the arrangement and construction of parts may be made by those skilled in the art. All such changes are encompassed within the scope and spirit of the appended claims.

What is claimed is:

1. A valve comprising:
 a body comprising:
  an inlet;
  an outlet;
  a first surface adjacent to said inlet; and
  a second surface adjacent to said outlet and spaced from said first surface;
 a plate disposed between said first and second surfaces and defining a port therethrough, said plate being movable between an open position wherein said port is substantially aligned with said inlet and outlet for providing communication therebetween and a closed position wherein said port is unaligned with said inlet and said outlet;
 first sealing means for sealingly engaging a first side of said plate, said first sealing means being disposed around an end of said inlet such that differential pressure as a result of fluid flowing through the valve forces said first sealing means against said first surface of said plate; and
 second sealing means for sealingly engaging a second side of said plate, said second sealing means being disposed around an end of said outlet such that said differential pressure forces said second side of said plate against said second sealing means;
 wherein:
  said first surface defines a recess therein around said end of said inlet, said first recess having a shoulder therein sealingly engaged with said first sealing means and disposed at an acute angle with respect to a central axis of said first and second sealing means;
  said second surface defines a second recess therein around said end of said outlet, said second recess having a shoulder therein sealingly engaged with said second sealing means and disposed at an acute angle with respect to said central axis;
  said first sealing means is disposed in said first recess; and
  said second sealing means is disposed in said second recess.

2. The valve of claim 1 wherein said first and second surfaces of said body and said first and second sides of said plate are substantially parallel.

3. The valve of claim 1 wherein said first and second sealing means define a groove thereon adapted for receiving a tool therein for facilitating removal of said first and second sealing means from said first and second recesses.

4. A valve comprising:
 a body defining a cavity therein and comprising:
  first and second facing surfaces on opposite ends of said cavity;
  an inlet in communication with said cavity; and
  an outlet in communication with said cavity;
 a plate defining a port therethrough and rotatably disposed in said cavity between an open position wherein said port provides communication between said inlet and outlet of said body and a closed position wherein said plate prevents communication between said inlet and outlet of said body;
 an actuation gear disposed in said cavity adjacent to said plate, said actuation gear having a geared surface thereon;
 a pinion gear having a geared surface thereon is geared engagement with said actuation gear such that rotation of said pinion gear results in rotation of said actuation gear and said plate removing said plate between said open and closed positions; and
 bushing means removably disposed in said cavity and around said plate and actuation gear for facilitating rotation of said plate and actuation gear.

5. The valve of claim 4 wherein said bushing means is characterized by a substantially cylindrical bushing.

6. The valve of claim 4 further comprising sealing means between said bushing means and said body.

7. The valve of claim 6 wherein said sealing means is characterized by a metal-to-metal seal disposed around said bushing means.

8. A valve comprising:
 a body defining a cavity therein and comprising:
  first and second facing surfaces on opposite ends of said cavity;
  an inlet in communication with said cavity; and
  an outlet in communication with said cavity;
 a plate defining a port therethrough and rotatably dispensed in said cavity between an open position wherein said port provides communication between said inlet and outlet of said body and a closed position wherein said plate prevents communication between said inlet and outlet of said body;
 an actuation gear disposed in said cavity adjacent to said plate, said actuation gear having a geared surface thereon;
 a pinion gear having a geared surface thereon in geared engagement with said actuation gear such that rotation of said pinion gear results in rotation of said actuation gear and said plate for moving said plate between said open and closed positions; and
 a shaft extending from said pinion gear, said shaft being eccentric with respect to said pinion gear;
 wherein, said geared surface of said actuation gear has a cam-shaped pitch line adapted for maintaining said geared surface in geared engagement with said pinion gear as said pinion gear is eccentrically rotated about said shaft.

9. The valve of claim 8 wherein said shaft is integrally formed with said pinion gear.

10. The valve of claim 8 wherein:
 said shaft extends through a portion of said body; and
 further comprising sealing means for sealing between said shaft and said body.

11. The valve of claim 10 wherein said sealing means comprises metal-to-metal sealing means.

12. The apparatus of claim 11 wherein said sealing means further comprises elastomeric sealing means.

13. The valve of claim 8 wherein:
 said body defines a first recess in communication with said inlet and said cavity;
 said body defines a second recess in communication with said outlet and said cavity; and
 further comprising:

a first seal disposed in said first recess, said first seal being forced into sealing engagement with a first side of said plate by differential pressure due to fluid flowing through the valve when said plate is in said open position thereof; and a second seal disposed in said recess such that a second side of said plate is forced into sealing engagement with said second seal by said differential pressure.

14. The valve of claim 13 wherein said first and second define a radially outer groove therein for facilitating removal of said first and second seals from said first and second recesses.

15. The valve of claim 13 wherein:
said first recess defines a shoulder therein sealing engaged with a portion of said seal; and
said second recess defines a shoulder therein sealing engaged with a portion or said second seal.

16. The valve of claim 15 wherein said shoulders are angled with respect to longitudinal axes of said seals.

17. The valve of claim 13 comprising elastomeric sealing means for sealing between said first seal and said body and between said second seal and said body.

18. A valve comprising:
a body defining a cavity therein and comprising:
first and second facing surfaces on opposite ends of said cavity;
an inlet in communication with said cavity; and
an outlet in communication with said cavity;
a plate defining a port therethrough and rotatably disposed in said cavity between an open position wherein said port provides communication between said inlet and outlet of said body and a closed position wherein said plate prevents communication between said inlet and outlet of said body;
an actuation gear disposed in said cavity adjacent to said plate, said actuation gear having a geared surface thereon;
a pinion gear having a geared surface thereon in geared engagement with said actuation gear such that rotation of said pinion gear results in rotation of said actuation gear and said plate for moving said place between said open and closed positions;
bushing means disposed in said cavity and around said plate and said actuation gear for facilitating rotation of said plate and actuation gear; and
sealing means for sealing between said bushing means and said body, said sealing means comprising:
a metal-to-metal seal disposed around said bushing means; and
elastomeric sealing means for sealing between said metal-to-metal seal and said body.

19. A valve comprising:
a body comprising:
an inlet;
an outlet;
a first surface adjacent to said inlet; and
a second surface adjacent to said outlet and spaced from said first surface;
a plate disposed between said first and second surfaces and defining a port therethrough, said plate being movable between an open position wherein said port is substantially aligned with said inlet and outlet providing communication therebetween and a closed position wherein said port is unaligned with said inlet and said outlet; and
an actuation gear disposed between said first and second surfaces adjacent to said plate, said actuation gear comprising a geared surface with a curvilinear pitch line;
a pinion gear engaged with said actuation gear, said pinion gear being rotatable about a shaft extending therefrom and disposed eccentrically with respect thereto, wherein said curvilinear pitch line of said actuation gear is adapted for maintaining said geared surface in geared engagement with said pinion gear as said pinion gear is eccentrically rotated about said shaft and thereby resulting in rotation of said actuation gear and said plate within said body for moving said plate between said open and closed positions thereof;
first sealing means for sealingly engaging a first side of said plate, said first sealing means being disposed around an end of said inlet such that differential pressure as a result of fluid flowing through the valve forces said first sealing means against said first surface of said plate; and
second sealing means for sealingly engaging a second side of said plate, said second sealing means being disposed around an end of said outlet such that said differential pressure forces said second side of said plate against said second sealing means.

20. The valve of claim 19 wherein said first and second surfaces of said body and said first and second sides of said plate are substantially parallel.

21. The valve of claim 19 wherein:
said first surface defines a first recess therein around said end of said inlet;
said second surface defines a second recess therein around said end of said outlet;
said first sealing means in disposed in said first recess; and
said second sealing means is disposed in said second recess.

22. The valve of claim 21 wherein:
said first recess has a shoulder therein sealingly engaged with said first seal; and
said second recess has a shoulder therein sealingly engaged with said second seal.

23. The valve of claim 22 wherein said shoulders are angled with respect to a central axis of said first and second sealing means.

24. The valve of claim 21 wherein said first and second sealing means define a groove thereon adapted for receiving a tool therein for facilitating removal of said first and second sealing means from said first and second recesses.

* * * * *